3,393,186
PERFLUORO-ALKENYLACRYLATES AND
POLYMERS THEREOF
James D. Groves, Hudson Township, St. Croix County, Wis., assignor to Minnesota Mining and Manufacturing Company, St. Paul, Minn., a corporation of Delaware
No Drawing. Filed Mar. 15, 1965, Ser. No. 439,983
14 Claims. (Cl. 260—89.5)

ABSTRACT OF THE DISCLOSURE

Diunsaturated monoesters of unsaturated fluorinated alcohols and $\alpha,\beta$-unsaturated monocarboxylic acids, especially acrylate-type esters of the formula $$R_fCH=CH(CH_2)_nO\overset{O}{\underset{\|}{C}}-\overset{R}{\underset{|}{C}}=CH_2$$

wherein $R_f$ is a fluorocarbon radical, $n$ is 0–16 and R is hydrogen or methyl are disclosed. Also disclosed are polymers of these esters which can be used to coat articles and form oil and water repellent coatings thereon.

---

The present invention relates to novel and useful fluorine-containing esters and polymers.

It is an object of this invention to provide novel, fluorinated unsaturated esters. It is another object of the invention to provide certain fluorinated acrylate-type ester monomers. It is another object of this invention to provide certain novel fluorinated polymers. It is a particular object of this invention to provide novel oil and water repellent treatments for substrates. It is another object of this invention to provide new and useful oil and water repellent treating agents. It is a further object of this invention to provide durably oil and water repellent articles. It is still another object of the present invention to provide durably oil and water repellent fibers. Various other objects and advantages will become apparent to those skilled in the art upon reading the accompanying description and disclosure.

The compounds of the present invention are diunsaturated monoesters of unsaturated fluorinated alcohols and $\alpha,\beta$-unsaturated monocarboxylic acids such as acrylic acid, methacrylic acid and $\alpha$-chloro acrylic acid. Preferably, the $\alpha,\beta$-unsaturated acids are halogen free. These compounds are capable of being polymerized through the unsaturated group derived from the carboxylic acid precursor to form addition polymers. The polymeric materials thus produced exhibit oil and water repellent characteristics. They can be cast in the form of thin sheets or films which have these properties, or they can be employed as coatings as more fully described hereinafter. These polymers are stable and have no substantial adverse effect on substrates upon which they are coated. A preferred class of compounds of the invention are acrylate-type esters of the formula:

$$R_fCH=CH\left(CH_2\right)_n O\overset{O}{\underset{\|}{C}}-\overset{R}{\underset{|}{C}}=CH_2$$

wherein $R_f$ is a fluorocarbon group having from 3 to 18 carbon atoms, $n$ is 0–16 and R is hydrogen or methyl. In the particularly preferred esters $n$ is at least 1.

The complete fluorocarbon group can be a perfluoroalkyl group having an open (acyclic) straight- or branched-chain, or a cyclic structure (e.g., a perfluorocyclohexyl group having a 6-membered ring structure) or it can consist of a combination of perfluoroalkyl straight chain and perfluorocyclic groups. The perfluorocarbon group may be bonded to the remainder of the molecule through either a cyclic or acyclic carbon atom (that is, this carbon atom may or may not be in a ring) and two carbon atoms of the fluorocarbon group may be linked together by an oxygen atom or three carbons may be linked together by a nitrogen atom, since oxygen and nitrogen provide very stable linkages between fluorocarbon groups and do not interfere with the highly stable and inert character of the complete fluorocarbon group or structure, as is shown, for instance, in U.S. Patent Numbers 2,500,388 and 2,616,927.

The esters of the invention are conveniently prepared by esterification of the respective precursor unsaturated fluorinated alcohols and unsaturated acids. Thus the preferred esters are prepared by esterification with acrylic acid and methacrylic acid of alcohols of the formula:

$$R_fCH=(CH_2)_nOH$$

wherein $R_f$ and $n$ are as previously defined. These alcohols can be prepared from halongenated alcohols or esters thereof according to the following process:

$$R_fCH_2CHX(CH_2)_nOR' \rightarrow R_fCH=CH(CH_2)_nOH$$

wherein $R_f$ and $n$ are as previously defined, X is halogen other than fluorine (bromine, chlorine or iodine), R' is hydrogen or $$-\overset{O}{\underset{\|}{C}}R''$$

and R" is lower alkyl (ordinarily butyl or lower). Thus, where R' is hydrogen, the process involves only a dehydrohalogenation step and when R' is the ester residue $$-\overset{O}{\underset{\|}{C}}R''$$

it also involves saponification (replacing the acyl group with hydrogen). The dehydrohalogenation can be carried out by treating the halogenated precursor with sodium methylate or other similar reagent. If the halogenated precursor is an ester (i.e., if R' is $$-\overset{O}{\underset{\|}{C}}R'')$$

the saponification and dehydrohalogenation can be carried out simultaneously by adding water or an alcoholic solvent (such as methanol, ethanol or propanol) to the reaction mixture. If the precursor halogenated material is an alcohol, these reagents may be present or not as desired. Processes for the preparation of these precursors are disclosed in United States Patents 2,965,659 and 3,171,861. Other alcohols which can be used in preparing the esters of the invention include $CF_2=CClCH_2OH$, $$CCl_2=CFCH_2OH, CHCl=CFCH_2OH,$$
$$CF_3CH=C(CF_3)OH, \text{ etc.}$$

The esters of the invention are valuable monomers and are readily homopolymerized and copolymerized by methods known to the art, for example, by bulk polymerization, solution polymerization and emulsion polymerization, using catalysts such as benzoyl peroxide or other free radical polymerization initiators. Among the solvents which can be used as media in the solution polymerizations and as application solvents (that is when applying the resulting polymers to substrates) are trichlorofluoromethane, 1,1,2-trichloro - 1,2,2 - trifluoroethane, benzene, benzotrifluoride, xylene hexafluoride, 1,1,1-trichloroethane and butyl acetate. Suitable comonomers include ethylenically unsaturated monomers, for example, vinyl acetate, vinyl stearate, vinyl chloride, vinyl fluoride, vinylidene chloride, vinylidene fluoride, vinyl chloroacetate, acrylonitrile, vinylidene cyanide, styrene, alkylated styrenes, halogenated styrenes, alkyl and epoxyalkyl esters of acrylic acid, methacrylic acid and α-chloroacrylic acid, methacrylonitrile, vinylcarbazole, vinyl pyrrolidone, vinyl pyridine, vinyl alkyl ethers, vinylalkyl ketones, butadiene, chloroprene, fluoroprene and isoprene. Block and graft copolymers (i.e., segmented copolymers) are included as are homogeneous polymers (in which the component monomeric units appear in more or less random fashion therein). Segmented copolymers are discussed at some length in U.S. Patent 3,068,187.

The preferred polymers of the invention are characterized by repetitive or recurring units which can be represented as follows:

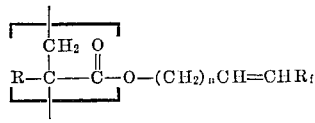

wherein $R_f$, R and $n$ are previously defined. Preferably, $n$ is at least 1 in these polymers.

The polymers of the invention are useful inter alia to impart highly durable repellence to oil and water and resistance to soiling to articles coated. Fibrous and porous surfaces may be treated with the polymers to achieve these results. Illustrative articles to be treated are woven fabrics or cloth, random web materials including felt and paper, wood, leather, fur, and asbestos. Among the articles which are advantageously treated are apparel, upholstery, draperies, carpeting, bags, containers, luggage, hand bags, shoes and jackets.

When the substrate treated is a fabric, 0.05 to 5 percent (preferably 0.1 to 1 percent) by weight of the polymer based on the weight of the fabric produces desirable surface properties. Illustrative textiles which can be advantageously treated with the copolymers of this invention are those based on natural fibers, e.g., cotton, wool, mohair, linen, jute, silk, ramie, sisal, kenaf, etc., and those based on synthetic fibers, e.g., rayon, acetate, acrylic polyester, saran, asylon, nytril, nylon, spandex, vinyl, olefin, vinyon and glass fibers (these designations of synthetic fibers are the proposed generic terms set up by the Federal Trade Commission). The treatment of these fabrics with the compositions of this invention imparts no adverse effect to the hand of the fabric and in some cases has a softening effect, thereby improving the hand.

The polymers are applied as surface treatments by known methods of coating such as spraying, brushing or impregnation from solution in organic solvents or dispersions in aqueous or organic solvents. A particularly convenient method of application is as an aerosol spray from a pressured aerosol container.

The polymers may be used as the sole component in the treating vehicle or as a component in a complex multi-ingredient formulation. The substrate can be treated with one or more conventional finishes (such as mildew preventives, moth resisting agents, modified crease resistant resins, lubricants, softeners, sizes, flame retardants, anti-static agents, dye fixatives, and water repellents) and then with the polymer or alternatively with a conventional finish or finishes and the polymer simultaneously. In the treatment of paper the polymer may be present as an ingredient in a wax, elastomer or wet strength resin formulation.

The following examples are offered to furnish a better understanding of the present invention and are not to be construed as in any way limiting thereof. While the surface treatment portions of the examples relate to fabrics, it should be understood that other materials of the previously defined types can be treated in essentially analogous manners. All percentages are by weight unless otherwise specified.

Example 1.—Preparation of
$C_8F_{17}CH=CHCH_2OCOCH=CH_2$

About 12.0 g. (0.0252 m.) of $C_8F_{17}CH=CHCH_2OH$ (index of refraction $n_D^{23}=1.3328$, boiling point 62–65° C./0.08 mm. Hg), 2.6 g. (0.03 m.) of acrylic acid ($CH_2=CHCO_2H$), five drops of $H_2SO_4$ and 0.1 gram of finely divided Cu are refluxed in heptane until 0.5 ml. of $H_2O$ have been collected in a Dean Stark trap. The mixture is neutralized with 10% $NaHCO_3$ solution. The organic phase is separated and dried over $MgSO_4$. Vacuum distillation gives 8.0 g. of the acrylate monomer

B.P. 85° C./0.5 mm. Hg, $n_D^{26}$ 1.3453.

Example 2.—Preparation of
$C_8F_{17}CH=CHCH_2OCOC(CH_3)=CH_2$

This compound is prepared by the process of Example 1 but using methacrylic acid in place of acrylic acid. Vacuum distillation gives $C_8F_{17}CH=CHCH_2OCOC(CH_3)=CH_2$ B.P. 60–65° C./0.1 mm. Hg, $n_D^{25}$ 1.3534.

Example 3.—Preparation of
$C_8F_{17}CH=CH(CH_2)_9OCOCH=CH_2$

This compound is also prepared by the process of Example 1 but using the alcohol $C_8F_{17}CH=CH(CH_2)_9OH$ (a colorless liquid boiling at 121–125° C./0.08 mm. Hg, $n_D^{25}$ 1.3770). It is not distilled, however, due to its high molecular weight. Gas-liquid chromatographic analysis of the product indicates that it contains 86% of

Example 4.—Preparation of
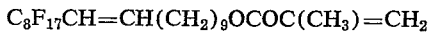

This compound is prepared in the same manner as in the three previous examples using

and methacrylic acid. Gas-liquid chromatographic analysis of the undistilled monomer indicates that it contains 91% of the methacrylate monomer

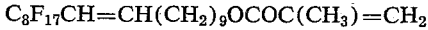

The following examples relate to the polymerization of the acrylate-type monomers of Examples 1–4, their application to fabrics and the evaluation thereof.

The procedure employed to prepare the polymers in the following examples involves the following sequence of steps:

(a) Charging the reactants to a screw cap glass bottle equipped with a self-sealing rubber gasket.

(b) Removing oxygen by flushing the bottle with a stream of oxygen-free nitrogen gas.

(c) Sealing the bottle.

(d) Polymerizing the contents by placing in an end-over-end rotator in a water bath at the specified temperature and for the specified period of time.

The fabric treatments in the examples are as follows: The fabric is immersed in a pad bath (containing the ingredients as indicated), the fabrics are run through rubber squeeze rolls at a nip pressure of 30 p.s.i. and then cured.

The water repellency of the treated fabrics is measured by Standard Test No. 22–52, published in the 1952 Technical Manual and Yearbook of the American Association of Textile Chemists and Colorists, vol. XXVIII, page 136. The "spray rating" is expressed on a 0 to 100 scale, wherein 100 is the highest possible rating.

The oil repellency test is based on the different penetrating properties of two hydrocarbon liquids, mineral oil and n-heptane. Mixtures of these two liquids are miscible in all proportions and show penetrating properties which increase with an increase in the n-heptane content of the mixture. The oil repellency rating numbers used herein and the compositions of the corresponding test solutions are as follows:

| Oil Repellency Rating | Percept Heptane by Volume | Percent Mineral Oil by Volume |
|---|---|---|
| 150 | 100 | 0 |
| 140 | 90 | 10 |
| 130 | 80 | 20 |
| 120 | 70 | 30 |
| 110 | 60 | 40 |
| 100 | 50 | 50 |
| 90 | 40 | 60 |
| 80 | 30 | 70 |
| 70 | 20 | 80 |
| 60 | 10 | 90 |
| 50 | 0 | 100 |
| 0 | | (1) |

[1] No holdout to mineral oil.

To measure the oil repellency of a treated fabric, 3" x 8" swatches thereof are cut and placed flat on a table. A drop of each oil mixture is gently placed on the surface of the fabric. The number corresponding to that mixture containing the highest percentage heptane which does not penetrate or wet the fabric after three minutes contact is considered the oil repellency rating of the sample.

The laundering cycle referred to herein is as follows: The treated fabrics are laundered in a 9 lb. load, agitating, automatic washing machine using water at 140° F. and a commercial detergent and then tumble-dried in an automatic drier for 20 minutes at 190° F. before being tested. They are not ironed after drying.

The dry cleaning cycle referred to herein is as follows: The treated fabrics are dry cleaned in a commercial dry cleaning establishment using perchloroethylene containing a potassium oleate soap as the vehicle. They are not pressed after cleaning.

Example 5.—Emulsion polymers of

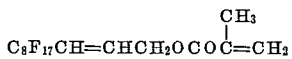

A glass bottle is charged with 2.0 g.

2.52 g. of distilled water, 1.08 g. of acetone, 0.04 g.

$$C_8F_{17}SO_2NHC_3H_6N(CH_3)_2 \cdot HCl$$

(Emulsifier A), 0.06 g. of a polyoxyethylene lauryl ether emulsifier (available from the Atlas Powder Company under the trade designation "Brij 35" and 0.004 g. $K_2S_2O_8$. After 23 hours reaction at 50° C., a 95% conversion to latex polymer is obtained.

This latex polymer is used to treat six cotton and cotton-polyester fabrics from an aqueous pad bath containing 0.3% of the

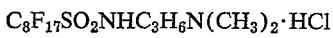

1.4% poly-2-ethyl hexyl methacrylate, 10% of a 50% solution of a triazine formaldehyde resin (available from the American Cyanamid Corporation under the trade designation "Resin 44") and 1.5% of an inorganic magnesium salt catalyst. The six fabrics have an average oil repellency of 100 and an average spray rating of 100. After one commercial dry cleaning they average 100 oil rating and 80 spray rating.

Example 6.—Emulsion polymers of
$$C_8F_{17}CH=CHC_9H_{18}OCOCH=CH_2$$

A glass bottle is charged with 5.0 g. of $$C_8F_{17}CH=CHC_9H_{18}OCOCH=CH_2$$

6.3 g. of distilled water, 2.7 g. of acetone, 0.1 g. of

(Emulsifier B), 0.15 g. of "Brij 35," and 0.01 g. of $K_2S_2O_8$. After 16 hours reaction at 50° C., a 93% conversion to latex polymer is obtained.

When used to treat cotton and cotton/dacron fabrics as in Example 5, this product also confers oil and water repellency to the fabrics.

Example 7.—Segmented copolymer of

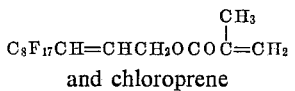

and chloroprene

A segmented copolymer as described in U.S. Patent 3,068,187 is prepared by charging to a glass bottle 5.0 g. of

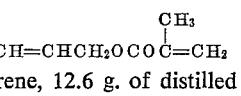

5.0 g. of chloroprene, 12.6 g. of distilled water, 5.4 g. of acetone, 0.2 g. of Emulsifier A, 0.3 g. of "Brij 35," 0.02 g. of $K_2S_2O_8$, 0.03 g. of tert-dodecyl mercaptan, and 0.03 g. n-octyl mercaptan. After 16 hours reaction at 50° C., a 99% conversion to latex polymer is obtained.

This latex is used to treat six cotton and cotton/polyester fabrics from a pad bath which contains 0.25% segmented copolymer solids, 10% of "Resin 44" and 2% of the inorganic magnesium salt catalyst. The fabrics are rendered oil and water repellent by this treatment.

Example 8.—Sequential polymers of

and $C_8F_{17}CH=CHCH_2OCOCH=CH_2$ on poly - 2 ethyl hexyl methacrylate

A prepolymer latex of 2-ethyl hexyl methacrylate is prepared as follows:

A glass bottle is charged with 50 g. of 2-ethyl hexyl methacrylate, 63 g. of distilled water, 27 g. of acetone, 1 g. of "Emulsifier B," 1.5 g. of "Brij 35," 0.25 g. of tert.-dodecyl mercaptan, and 0.1 g. of $K_2S_2O_8$. After 18 hours reaction at 50° C., the monomer is completely converted to latex polymer.

(A) 

To 24 g. of the above latex (8.5 g. poly-2-ethyl hexyl methacrylate) in a bottle are added 1.5 g. of

11.9 g. of distilled water and 3.0 g. of acetone. After 16 hours reaction at 85° C., the resulting latex contains 19.4% of polymer solids (some precoagulum also present).

(B)    $C_8F_{17}CH=CHCH_2OCOCH=CH_2$

In a similar fashion, to 24 g. of the 2-ethyl hexyl methacrylate latex in a bottle are added 1.5 of $$C_8F_{17}CH=CHCH_2OCOCH=CH_2$$

11.9 g. of distilled water and 3.0 of acetone. After 16 hours reaction at 85° C., the resulting latex contains 23.2% of polymer solids.

The above latices are used to treat cotton and cotton/dacron fabrics from aqueous pad baths containing in each case, 2% polymers solids (from (A) and (B) above), 10% of "Resin 44" and 2% of the inorganic magnesium salt catalyst. Oil repellencies of 80 to 100 and spray ratings of 70 to 80 are obtained. After one laundering oil repellencies are 60 to 70 and spray ratings are 70.

Example 9.—Sequential polymers of

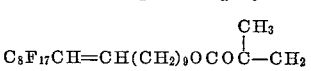

and $C_8F_{17}CH=CH(CH_2)_9OCOCH=CH_2$ on 2 - ethyl hexyl methacrylate: glycidyl methacrylate A prepolymer latex is prepared as follows: To a glass bottle are charged 117.6 grams of 2 - ethyl hexyl methacrylate, 2.4 g. of glycidyl acrylate, 151.2 g. of distilled water, 64.8 g. of acetone, 6.0 g. of "Brij 35," and 0.24 g. of $K_2S_2O_8$. After 16 hours reaction, the monomers are completely converted to latex copolymer.

(A)

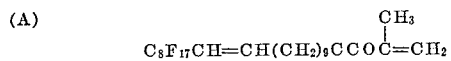

To 9.9 g. of the above latex (3.5 g. polymer) in a bottle are added 1.5 g. of

6.8 g. of distilled water, and 1.9 g. of acetone. After 16 hours reaction at 50° C., the resulting latex contains 21.3% of polymer solids.

(B)

$$C_8F_{17}CH=CH(CH_2)_9OCOCH=CH_2$$

To 9.9 g. of the prepolymer latex (3.5 g. polymer) in a bottle are added 1.5 g. of $$C_8F_{17}CH=CH(CH_2)_9OCOCH=CH_2$$

6.8 g. of distilled water and 1.9 g. of acetone. After 16 hours reaction at 50° C., the resulting latex contains 21.9% polymer solids.

Latices A and B are used to treat cotton and cotton/dacron fabrics from aqueous pad baths containing 0.67% polymer solids, 10% of a solution of a triazine formaldehyde resin (available from the American Cyanamid Corportion under the trade designation "Resin 23"), 2% of the inorganic magnesium salt catalyst, 0.1% of glycolic acid and 0.02% of Emulsifier A. The fabrics are rendered durably water and oil repellent.

What is claimed is:

1. A fluorinated monomer of the formula:

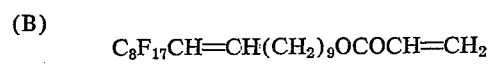

wherein $R_f$ is a fluorocarbon radical having from 3 to 18 carbon atoms, $n$ is 0–16 and R is selected from the group consisting of hydrogen and the methyl group.

2. A fluorinated monomer of the formula:

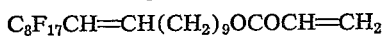

wherein $n$ is 0–16 and R is selected from the group consisting of hydrogen and the methyl group.

3. A fluorinated monomer of the formula:

$$\underset{\substack{O\ \ H\\ \|\ \ |}}{C_8F_{17}CH=CHCH_2O\,C-C=CH_2}$$

4. A fluorinated monomer of the formula:

$$\underset{\substack{O\ \ CH_3\\ \|\ \ |}}{C_8F_{17}CH=CHCH_2O\,C-C=CH_2}$$

5. A fluorinated monomer of the formula:

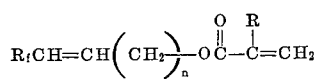

6. A fluorinated monomer of the formula:

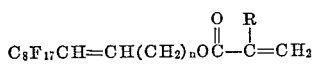

7. A polymer having a skeletal chain containing recurring units represented by the formula:

wherein $R_f$ is a fluorocarbon radical having from 3 to 18 carbon atoms, $n$ is 0–16 and R is selected from the group consisting of hydrogen and the methyl group.

8. A polymer having a skeletal chain containing recurring units represented by the formula:

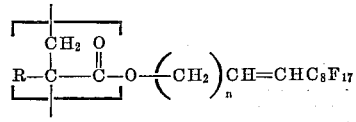

wherein $n$ is 0–16 and R is selected from the group consisting of hydrogen and the methyl group.

9. A polymer having a skeletal chain containing recurring units represented by the formula:

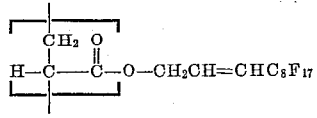

10. A polymer having a skeletal chain containing recurring units represented by the formula:

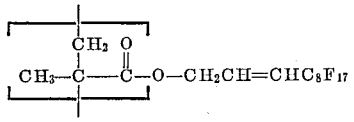

11. A polymer having a skeletal chain containing recurring units represented by the formula:

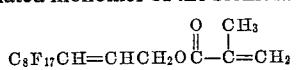

12. A polymer having a skeletal chain containing recurring units represented by the formula:

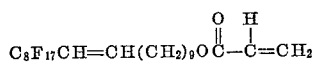

13. An article which has been coated with a polymer having a skeletal chain containing recurring units represented by the formula:

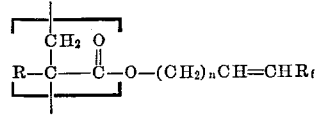

wherein $R_f$ is a fluorocarbon radical having from 3 to 18 carbon atoms, $n$ is 0–16 and R is selected from the group consisting of hydrogen and the methyl group, so as to have been rendered oil and water repellent.

14. Fibers coated with a polymer having a skeletal chain containing recurring units represented by the formula:

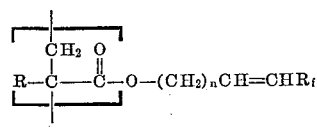

wherein $R_f$ is a fluorocarbon radical having from 3 to 18 carbon atoms, $n$ is 0–16 and R is selected from the group consisting of hydrogen and the methyl group, so as to have been rendered oil and water repellent.

References Cited

UNITED STATES PATENTS 3,102,103  8/1963  Ahlbrecht et al. ____ 260—89.5
3,255,163  6/1966  Gobran et al. _____ 260—89.5

JOSEPH L. SCHOFER, *Primary Examiner.*

H. WONG, *Assistant Examiner.*